United States Patent
Sato et al.

(10) Patent No.: US 6,855,084 B2
(45) Date of Patent: Feb. 15, 2005

(54) POWER TRANSMISSION SYSTEM IN VEHICLE

(75) Inventors: Takao Sato, Saitama (JP); Tomoyuki Kanda, Saitama (JP); Yoshimichi Tsubata, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/643,165

(22) Filed: Aug. 19, 2003

(65) Prior Publication Data

US 2004/0106488 A1 Jun. 3, 2004

(30) Foreign Application Priority Data

Aug. 20, 2002 (JP) ........................................ 2002-239542

(51) Int. Cl.[7] ......................... F16H 37/02; B60K 41/12
(52) U.S. Cl. ......................... 475/209; 475/210; 477/44
(58) Field of Search ........................... 475/207–10, 214; 477/44

(56) References Cited

U.S. PATENT DOCUMENTS

| | | | | |
|---|---|---|---|---|
| 5,895,335 A | * | 4/1999 | Haka | 475/210 |
| 5,944,628 A | * | 8/1999 | Lee | 475/214 |
| 6,379,278 B1 | * | 4/2002 | Eguchi et al. | 477/44 |
| 6,500,090 B2 | * | 12/2002 | Kanda et al. | 477/45 |

FOREIGN PATENT DOCUMENTS

| | | | |
|---|---|---|---|
| JP | 63-14228 | 3/1988 | |
| WO | WO009221896 A1 | * 12/1992 | 475/211 |

* cited by examiner

*Primary Examiner*—Roger Pang
(74) *Attorney, Agent, or Firm*—Westerman, Hattori, Daniels & Adrian, LLP (57) ABSTRACT

In a power transmission system in a vehicle including a continuously variable gear path and a multi-stage gear path, a difference between gear ratios at the start of forward travel and at the start of backward travel is minimized, while using a single-pinion type planetary gear mechanism. The continuously variable gear path includes a forward/backward travel switching mechanism comprising a single-pinion type planetary gear mechanism, and a belt-type continuously variable transmission. A multi-stage gear path comprising gears is set at a gear ratio closer to a LOW side from that of the belt-type continuously variable transmission. Thus, when the forward traveling and the backward traveling are switched over from one to another, it is unnecessary to suddenly change the gear ratio of the belt-type continuously variable transmission, which can contribute to an improvement in durability of belt-type continuously variable transmission.

2 Claims, 8 Drawing Sheets

POWER TRANSMISSION SYSTEM IN VEHICLE

BACKGROUND OF THE INVENTION

1. Field of the Invention

The present invention relates to a power transmission system in a vehicle, comprising a continuously variable gear path and a multi-stage gear path provided in parallel for transmitting a driving force from an engine to driven wheels.

2. Description of the Related Art

A conventional power transmission system in a vehicle is known from Japanese Patent Publication No. 63-14228.

In the conventional power transmission system, the rotation of a main shaft connected to an engine through a torque converter is transmitted to a counter shaft through a reduction gear train or a belt-type continuously variable transmission, and a forward/backward travel switching mechanism using a single-pinion type planetary gear mechanism is disposed between the counter shaft and driven wheels. At the start of forward travel of the vehicle and at the start of backward travel of the vehicle, a reduction gear train having a large reduction ratio is used; and during subsequent traveling of the vehicle, the reduction gear train is switched over to the belt-type continuously variable transmission to conduct the continuously variable gear shifting. The forward/backward travel switching mechanism for switching the forward and backward travels from one to another, includes a forward clutch adapted to couple a carrier to an output shaft, and a reverse brake adapted to couple the carrier to a casing.

The conventional power transmission system is designed as follows: when the forward clutch is brought into an engaged state, the carrier is coupled to the output shaft, whereby the rotation of the input shaft (the counter shaft) is transmitted, at the same speed and in the same rotational direction, to the output shaft to establish a forward gear shift stage; and when the reverse brake is brought into the engaged state, the rotation of the input shaft (the counter shaft) is transmitted, at an increased speed and in the reverse rotational direction, to the output shaft to establish a backward gear shift stage.

In this way, if the driving force is input through a ring gear into the forward/backward travel switching mechanism and output through a sun gear from the mechanism, during backward traveling of the vehicle, the rotational speed of the input shaft is increased and transmitted to the output shaft. Therefore, a problem exists that the driving force at the start of the backward travel is insufficient. Whereas, if the driving force is input through a sun gear into the forward/backward travel switching mechanism and output through a ring gear from the mechanism, the rotational speed of the input shaft is reduced and transmitted to the output shaft. Therefore, a problem exists that the driving force at the start of the backward travel is excessive as compared with that at the start of the forward travel.

Also, if a double-pinion type planetary gear mechanism is used for the forward/backward travel switching mechanism, a gear ratio between the input shaft and the output shaft can be set at 1:1, but resulting in several problems. The double-pinion type planetary gear mechanism having a large number of parts complicates the structure, and also the number of meshed portions of each gear is large and the rotational speed of the planetary gear is high resulting in an increase in noise.

The present invention has been accomplished with such circumstance in view, and it is an object to provide a power transmission system in a vehicle including a continuously variable gear path and a multi-stage gear path, in which a difference between gear ratios at the start of the forward travel and at the start of the backward travel is minimized while using a single-pinion type planetary gear mechanism.

SUMMARY OF THE INVENTION

To achieve the above object, according to a first feature of the present invention, there is provided a power transmission system in a vehicle, comprising a continuously variable gear path and a multi-stage gear path provided in parallel for transmitting a driving force from an engine to driven wheels, wherein the continuously variable gear path is disposed between the engine and a continuously variable gear mechanism, and has a single-pinion type forward/backward travel switching mechanism adapted to receive the driving force input from the engine through a sun gear and to output the driving force to the continuously variable gear mechanism through a ring gear, and wherein the multi-stage gear path is set at a gear ratio closer to a LOW side from that of the continuously variable gear mechanism.

With this arrangement, the single-pinion type forward/backward travel switching mechanism adapted to receive the driving force input from the engine through the sun gear and to output the driving force to the continuously variable gear mechanism through the ring gear is disposed in the continuously variable gear path, and the multi-stage gear path is set at a gear ratio closer to the LOW side from that of the continuously variable gear mechanism. Therefore, a difference between the gear ratios in the multi-stage gear path and the continuously variable gear path can be minimized while using the single-pinion type forward/backward travel switching mechanism which is simple in structure and generates less noise, by using the multi-stage gear path having the gear ratio closer to the LOW side from that of the continuously variable gear mechanism at the start of forward travel of the vehicle, and using the continuously variable gear path which includes the forward/backward travel switching mechanism and the continuously variable gear mechanism each having a speed reducing function at the start of backward travel of the vehicle. Thus, when the forward traveling and the backward traveling are switched over from one to another, it is unnecessary to suddenly change the gear ratio of the continuously variable gear mechanism, which can contribute to an improvement in durability of the continuously variable gear mechanism.

According to a second feature of the present invention, the gear ratio in the multi-stage gear path and the gear ratio in the continuously variable gear path when the continuously variable gear mechanism is in a lowest speed state during backward travel are set at substantially the same value.

With this arrangement, the gear ratio in the multi-stage gear path used at the start of the forward travel and the gear ratio in the continuously variable gear path used at the start of the backward travel can be set at substantially the same value, and hence driven wheels can be driven with the same torque at the start of the forward travel and at the start of the backward travel of the vehicle.

A belt-type continuously variable transmission 29 in an embodiment corresponds to the continuously variable gear-shifting mechanism of the present invention.

DETAILED DESCRIPTION OF PREFERRED EMBODIMENT OF THE INVENTION

The present invention will now be described by way of an embodiment with reference to the accompanying drawings.

A casing 11 of a continuously variable transmission M for a vehicle comprises a torque converter case 12, a central transmission case 14, a left transmission case 15, and a transmission cover 16. A main shaft 17 and a counter shaft 18 are supported in parallel to each other within the casing 11. A torque converter 20 is disposed between a left end of a crankshaft 19 of an engine E and a right end of the main shaft 17, and includes: a pump impeller 22 connected to the crankshaft 19 through a driving plate 21; a turbine runner 23 coupled to the main shaft 17 to be opposed to the pump impeller 22; and a stator 24 disposed between inner peripheries of the pump impeller 22 and the turbine runner 23. A side cover 25 is fixed to the pump impeller 22 and the driving plate 21, and covers an outer side of the turbine runner 23. A lock-up clutch 26 is disposed between the turbine runner 23 and the side cover 25, and includes a disk-shaped piston 27 having an inner peripheral surface slidably supported on an outer peripheral surface of a boss of the turbine runner 23. A friction lining 28 is fixed to an outer peripheral portion of the piston 27, and is capable of abutting against an wall surface of the side cover 25.

A belt-type continuously variable transmission 29 is disposed between the main shaft 17 and the counter shaft 18, and includes: a driving pulley 30 supported on the main shaft 17; a driven pulley 31 supported on the counter shaft 18; and a metal belt 32 wound between the driving pulley 30 and the driven pulley 31. The driving pulley 30 includes a stationary pulley half 30a relatively rotatably supported on an outer periphery of the main shaft 17, and a movable pulley half 30b capable of being moved toward and away from the stationary pulley half 30a. The driven pulley 31 includes a stationary pulley half 31a formed integrally on an outer periphery of the counter shaft 18, and a movable pulley half 31b capable of being moved toward and away from the stationary pulley half 31a.

A forward/backward travel switching mechanism 33 using a single-pinion type planetary gear mechanism is mounted between the main shaft 17 and the driving pulley 30. The forward/backward travel switching mechanism 33 includes a sun gear 34 fixed to the main shaft 17, a ring gear 35 rotatably disposed to surround an outer periphery of the sun gear 34, a carrier 36 relatively rotatably supported on the main shaft 17, and a plurality of planetary gears 37 rotatably supported on the carrier 36 and meshed simultaneously with the sun gear 34 and the ring gear 35. The sun gear 34 (namely, the main shaft 17) of the forward/backward travel switching mechanism 33 is capable of being coupled to the driving pulley 30 through a wet multi-plate type forward clutch 38, and the carrier 36 is capable of being coupled to the casing 11 through a wet multi-plate type reverse brake 39.

When the forward clutch 38 of the forward/backward travel switching mechanism 33 is brought into an engaged state during forward traveling of the vehicle, the sun gear 34, integral with the main shaft 17, is coupled to the driving pulley 30 through the forward clutch 38, so that the driving pulley 30 is rotated in unison with the main shaft 17. Therefore, when the forward clutch 38 is in an engaged state, the deceleration by the forward/backward travel switching mechanism 33 is not conducted, and the rotation of the main shaft 17 is transmitted to the driving pulley 30 at the same speed and in the same direction.

When the reverse brake 39 of the forward/backward travel switching mechanism 33 is brought into an engaged state during backward traveling of the vehicle, the carrier 36 is coupled to the casing 11, whereby the rotation of the sun gear 34 integral with the main shaft 17 is transmitted through the planetary gears 37 and the ring gear 35 to the driving pulley 30, so that the driving pulley 30 is rotated at a speed reduced relative to the main shaft 17 and in the reverse direction.

A main first-speed gear 40 fixed to a left end of the main shaft 17 is meshed with an idling first-speed gear 42 fixed to an idling shaft 41. The idling first-speed gear 42 is meshed with a counter first-speed gear 45 supported through a one-way clutch 44 on a hub 43 which is rotatable relative to the counter shaft 18. This forms a stepped transmission path disposed in parallel to the belt-type continuously variable transmission 29. The hub 43 of the counter first-speed gear 45 is capable of being coupled to the counter shaft 18 through a wet multi-plate type LOW clutch 46.

A final driving gear 47 provided at a right end of the counter shaft 18 is meshed with a first reduction gear 49 fixed to a reduction shaft 48. A second reduction gear 50, fixed to the reduction shaft 48, is meshed with a final driven gear 53 fixed to a differential box 52 of a differential gear 51. The differential gear 51 is of a well-known type, and comprises differential pinions 55, 55 relatively turnably supported on a pinion shaft 54 mounted in the differential box 52, and differential side gears 57, 57 which are fixed to left and right axles 56L and 56R inserted into the differential box 52 and which are meshed with the differential pinions 55, 55.

The operation of the embodiment of the present invention having the above-described arrangement will be described below.

(1) At the Start of Forward Travel of Vehicle

Figure 1:
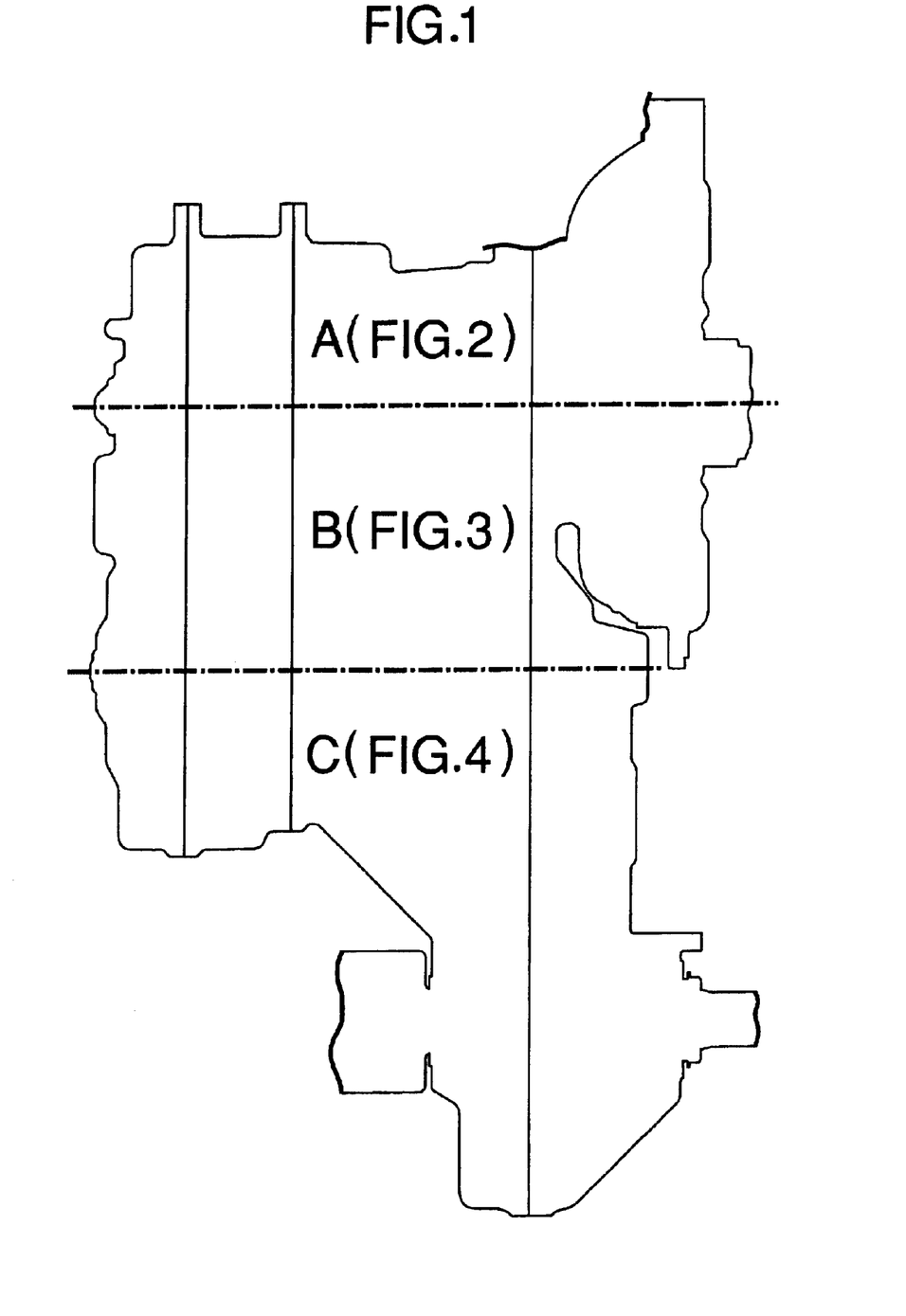
FIG. 1 is a diagram showing the contour of a continuously variable transmission for a vehicle (a map showing layouts in FIGS. 2 to 4).
Figure 2:
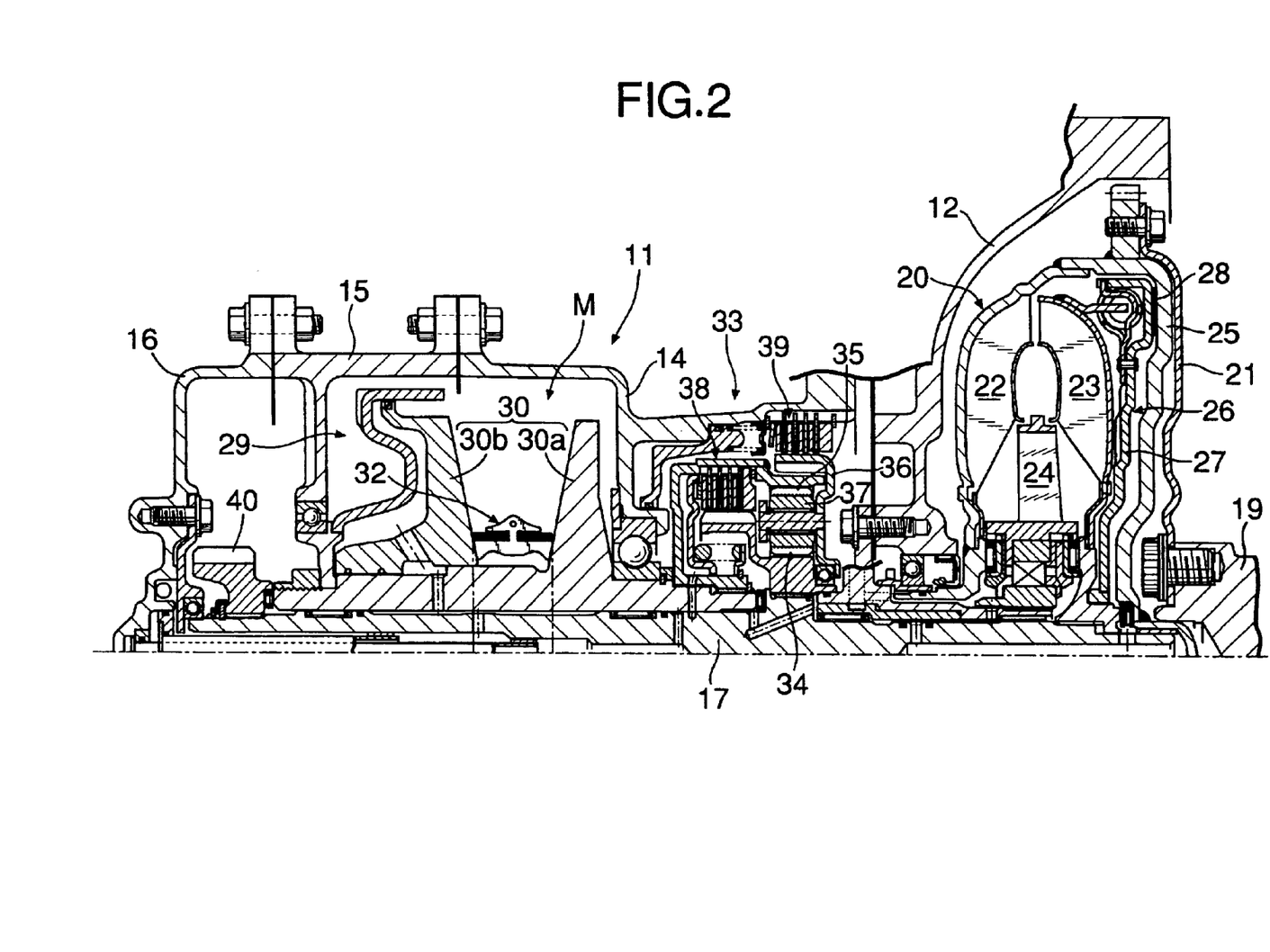
FIG. 2 is an enlarged view of a region A in FIG. 1.
Figure 3:
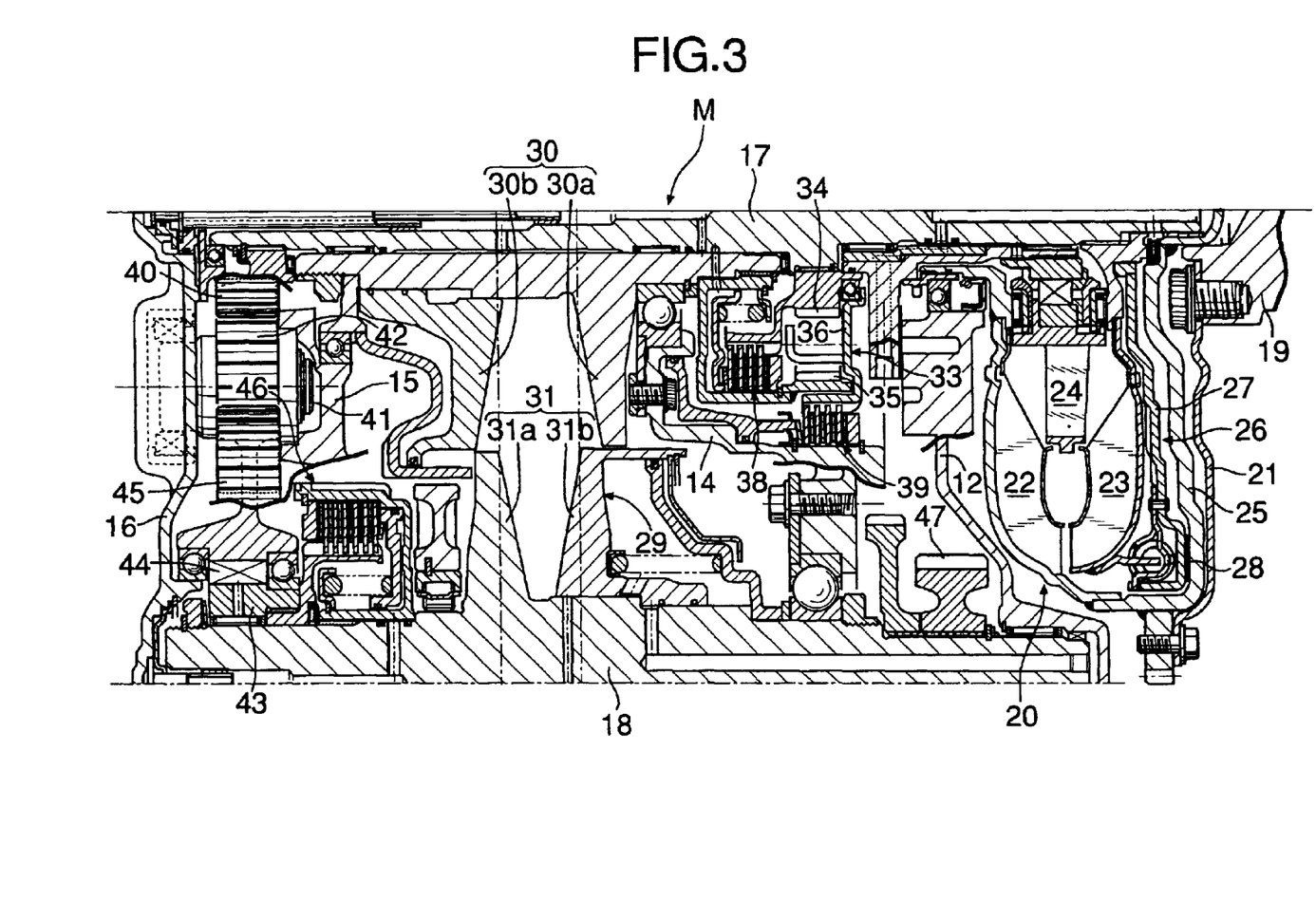
FIG. 3 is an enlarged view of a region B in FIG. 1.
Figure 4:
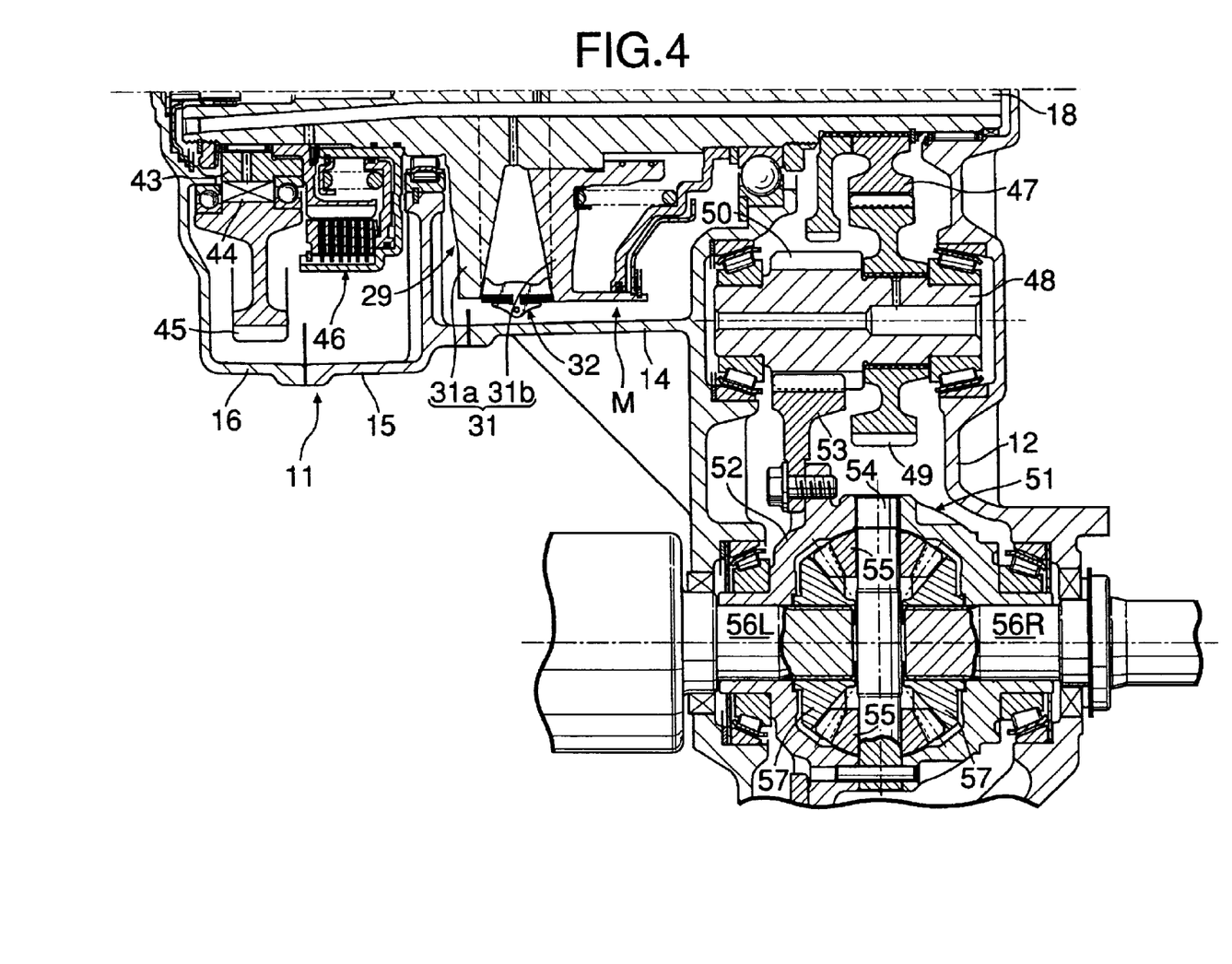
FIG. 4 is an enlarged view of a region C in FIG. 1.
Figure 5:
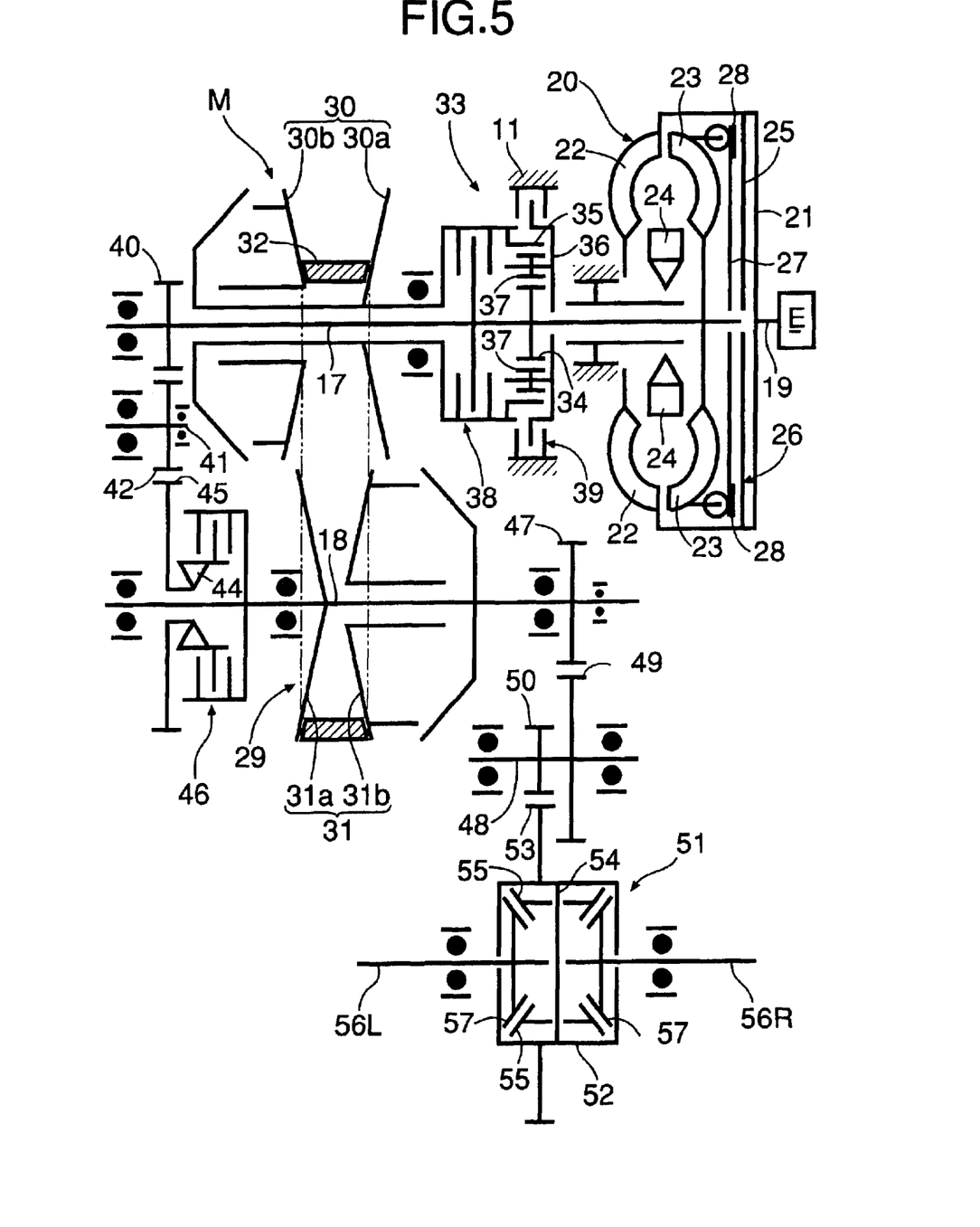
FIG. 5 is a skeleton view of the continuously variable transmission for the vehicle.
Figure 6:
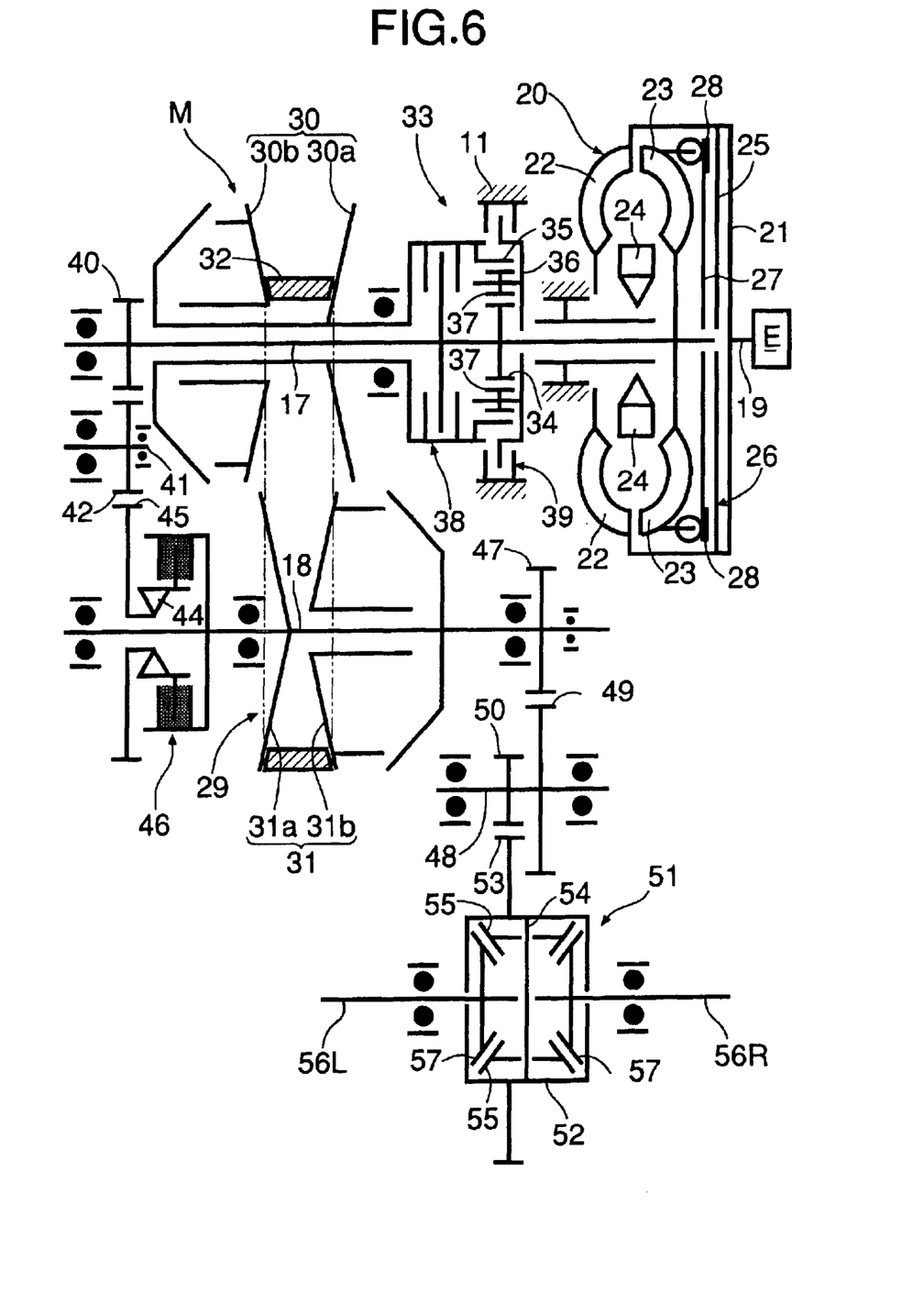
FIG. 6 is a view for explaining the operation at the start of the forward travel.

At the start of the forward travel of the vehicle, as shown in FIG. 6, the forward clutch 38 and the reverse brake 39 of the forward/backward travel switching mechanism 33 are released, and the LOW clutch 46 is brought into the engaged state. As a result, the rotation of the crankshaft 19 of the engine E is transmitted to left and right driven wheels through a path comprising the torque converter 20→the main shaft 17→the main first-speed gear 40→the idling first-speed gear 42→the counter first-speed gear 45→the one-way clutch 44→the LOW clutch 46→the counter shaft 18→the final driving gear 47→the first reduction gear 49→the second reduction gear 50→and the final driven gear 53→the differential gear 51→and the axles 56L and 56R.

At this time, the main shaft 17 and the counter shaft 18 can be rotated in the same direction to cause the vehicle to travel forwards, because the idling first-speed gear 42 is interposed between the main first-speed gear 40 and the counter first-speed gear 45. In addition, a reduction ratio between the main first-speed gear 40 and the counter first-speed gear 45 assumes a value suitable for starting the vehicle. The reduction ratio is set at a value closer to the LOW side from that of the belt-type continuously variable transmission 29 in a lowest-speed state.

(2) During the Forward Traveling of Vehicle

Figure 7:
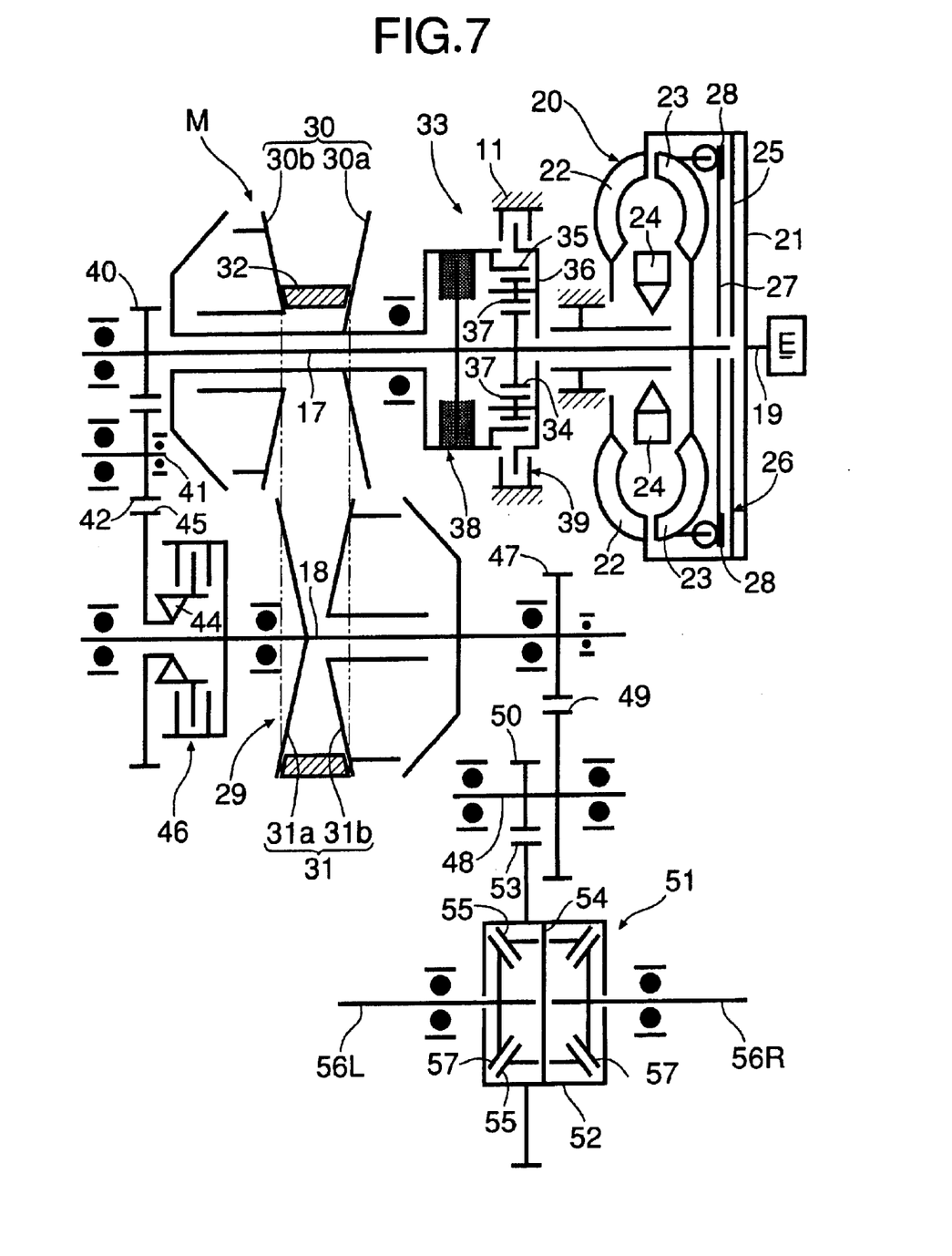
FIG. 7 is a view for explaining the operation during the forward traveling.

When the vehicle is started forwards by bringing the LOW-clutch 46 into an engaged state in the above-described manner, the forward clutch 38 is brought into the engaged state with the reverse brake 39 of the forward/backward travel switching mechanism 33 remaining released. As a result, the rotation of the crankshaft 19 of the engine E is transmitted to the left and right driven wheels through a path comprising the torque converter 20→the main shaft 17→the forward clutch 38→the driving pulley 30→the metal belt 32→the driven pulley 31→the counter shaft 18→the final driving gear 47→the first reduction gear 49→the second reduction gear 50→the final driven gear 53→the differential gear 51→and the axles 56L and 56R.

In this process, the reduction ratio in the lowest-speed state of the belt-type continuously variable transmission 29 assumes a value slightly closer to an OD from the reduction ratio between the main first-speed gear 40 and the counter first-speed gear 45. Therefore, a difference in rotation occurs between the counter shaft 18 and the counter first-speed gear 45 during a short time until the LOW clutch 46 is released, but such difference in rotation is absorbed by the slipping of the one-way clutch 44. Thus, the start of the forward travel provided by the main first-speed gear 40, the idling first-speed gear 42 and the counter first-sped gear 45 can be smoothly shifted to forward traveling by means of the belt-type continuously variable transmission 29. During the forward traveling of the vehicle, the gear ratio of the belt-type continuously variable transmission 29 is controlled between LOW and OD.

(3) At Backward Travel of Vehicle

Figure 8:
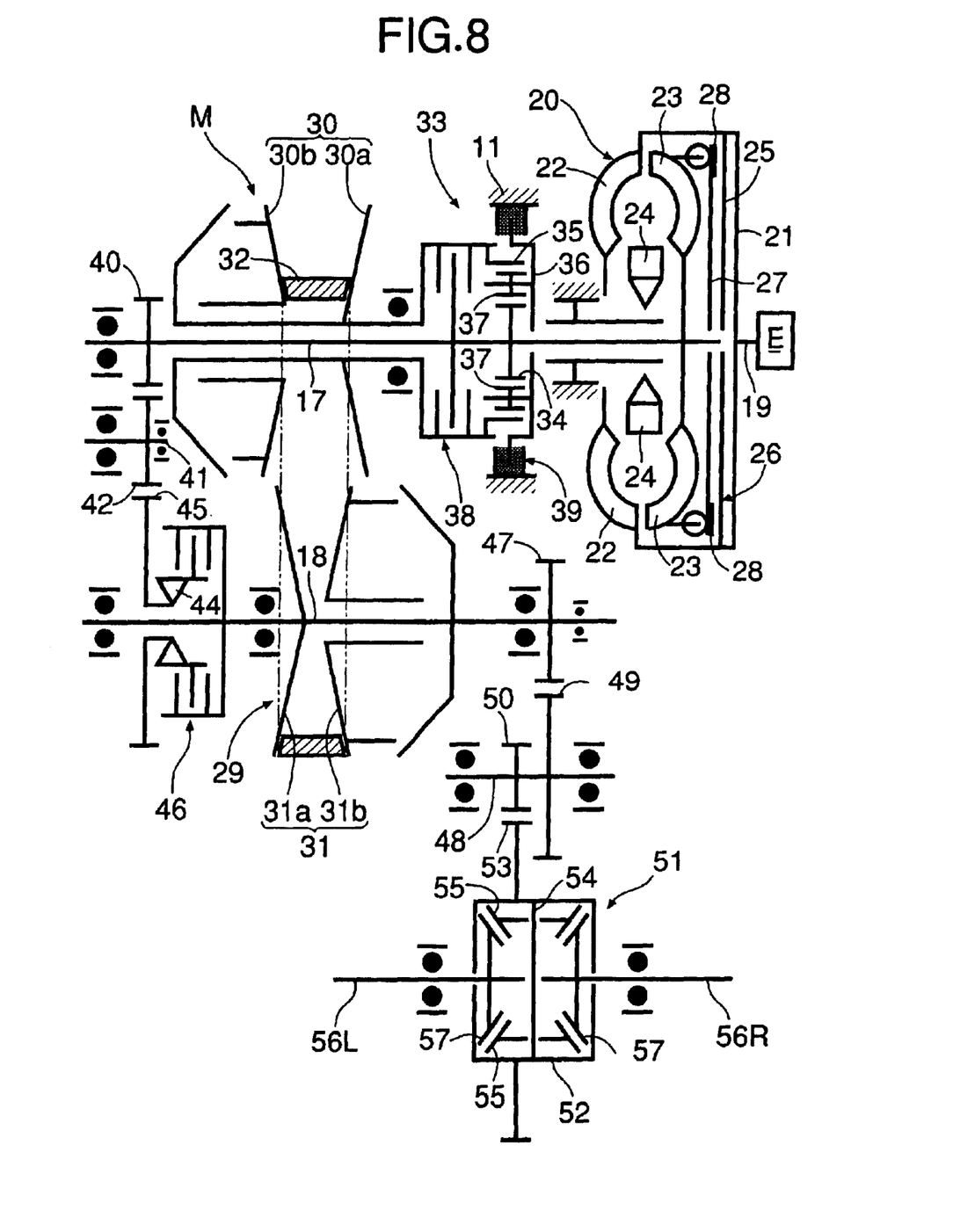
FIG. 8 is a view for explaining the operation during the backward traveling.

At the backward travel of the vehicle, as shown in FIG. 8, the forward clutch 38 and the LOW clutch 46 of the forward/backward travel switching mechanism 33 are released, and the reverse brake 39 is brought into the engaged state. As a result, the rotation of the crankshaft of the engine E is transmitted to the left and right driven wheels through a path comprising the torque converter 20→the main shaft 17→the sun gear 34→the planetary gears 37→the ring gear 35→the driving pulley 30→the metal belt 32→the driven pulley 31→the counter shaft 18→the final driving gear 47→the first reduction gear 49→the second reduction gear 50→the final driven gear 53→the differential gear 51→and the axles 56L and 56R. At this time, the backward travel of the vehicle becomes possible, because the rotational direction of the ring gear 35 is opposite from the rotational direction of the sun gear 34 of the forward/backward travel switching mechanism 33.

As described above, the reduction ratio between the main first-speed gear 40 and the counter first-speed gear 45 is set at the value closer to the LOW side from the reduction ratio of the belt-type continuously variable transmission 29 in the lowest speed state. However, a total reduction ratio of the reduction ratio of the forward/backward travel switching mechanism 33 and the reduction ratio of the belt-type continuously variable transmission 29 in the lowest sped state, can be substantially equalized to the reduction ratio between the main first-speed gear and the counter first-speed gear 45.

As a result, it is possible to equalize the reduction ratios at the start of forward travel and at the start of backward travel, without use of a double-pinion type planetary gear mechanism having a complicated structure and generating large noise or without special control of the gear ratio of the belt-type continuously variable transmission at the start of backward travel. Thus, it is unnecessary to suddenly change the gear ratio of the belt-type continuously variable transmission, for example, in the shift: the forward traveling→the stopping→the start of the backward travel of the vehicle, thereby preventing an excessively large load form acting on the metal belt 32 to cause a deterioration in durability of the metal belt 32.

Although the embodiment of the present invention has been describe, it will be understood that various modifications in design may be made without departing from the subject matter of the present invention.

For example, the belt-type continuously variable transmission 29 has been illustrated as a continuously variable transmission in the embodiment, but a continuously variable transmission other than the belt-type continuously variable transmission 29 can be employed in the present invention.

What is claimed is:

1. A power transmission system in a vehicle, comprising a continuously variable gear path and a multi-stage gear path provided in parallel for transmitting a driving force from an engine to driven wheels, wherein the continuously variable gear path is disposed between the engine and a continuously variable gear mechanism, and has a single-pinion type forward/backward travel switching mechanism adapted to receive the driving force input from the engine through a sun gear and to output the driving force to the continuously variable gear mechanism through a ring gear, and wherein the multi-stage gear path is set at a gear ratio closer to a LOW side from that of the continuously variable gear mechanism.

2. A power transmission system in a vehicle according to claim 1, wherein the gear ratio in the multi-stage gear path and the gear ratio in the continuously variable gear path when the continuously variable gear mechanism is in a lowest speed state during backward travel are set at substantially the same value.

* * * * *